United States Patent [19]

D'Orazio

[11] 4,092,051
[45] May 30, 1978

[54] MULTI-PURPOSE FREIGHT VEHICLE

[75] Inventor: Peter J. D'Orazio, Southampton, Pa.

[73] Assignee: The Budd Company, Troy, Mich.

[21] Appl. No.: 683,358

[22] Filed: May 5, 1976

[51] Int. Cl.² .............................................. B61D 3/06
[52] U.S. Cl. ..................................... 298/24; 105/243; 222/105
[58] Field of Search ................ 298/24, 37; 296/10–12; 105/239, 243; 222/105, 183

[56] References Cited

U.S. PATENT DOCUMENTS

| | | | |
|---|---|---|---|
| 2,648,293 | 8/1953 | Dorey | 298/27 X |
| 2,712,797 | 7/1955 | Woehrle et al. | 298/7 X |
| 3,222,099 | 12/1965 | Swallert | 296/10 |
| 3,756,469 | 9/1973 | Clark et al. | 298/24 X |
| 3,777,938 | 12/1973 | Nikowitz et al. | 298/28 X |

FOREIGN PATENT DOCUMENTS

| | | | |
|---|---|---|---|
| 653,422 | 9/1964 | Belgium | 296/10 |

Primary Examiner—Frank E. Werner

[57] ABSTRACT

This application discloses a multi-purpose freight vehicle, such as a roadway trailer, which, in one condition, presents a clear cargo space with a continuous floor for hauling packaged goods and which, in another condition, provides one or more container bags between a top fill opening and a bottom discharge hopper opening for hauling bulk goods, the bag being formed of strong flexible material having a top opening with means of support at the top fill opening of the vehicle roof and a more flexible top end portion with closure means to provide a tight dustproof seal; the flexible bag, when empty, being stored in a hopper to which its lower open end is attached and having means for retrieval through the top opening of the vehicle roof, as by a hook pole, the bag except at the top, being rectangular in cross section and cubical to provide maximum capacity within the shape of the vehicle; floor sections above the hopper are hinged transversely to swing up as floor trap doors to permit the bag or bags to be raised, and the liftable floor trap door sections having transverse floor beams which at their ends rest on side sills; and support securement and lift means for the floor trap doors which can be removed and stowed in a compartment at the front end of the vehicle when the vehicle is used with the bags collapsed into the hoppers and the floor sections lowered.

15 Claims, 11 Drawing Figures

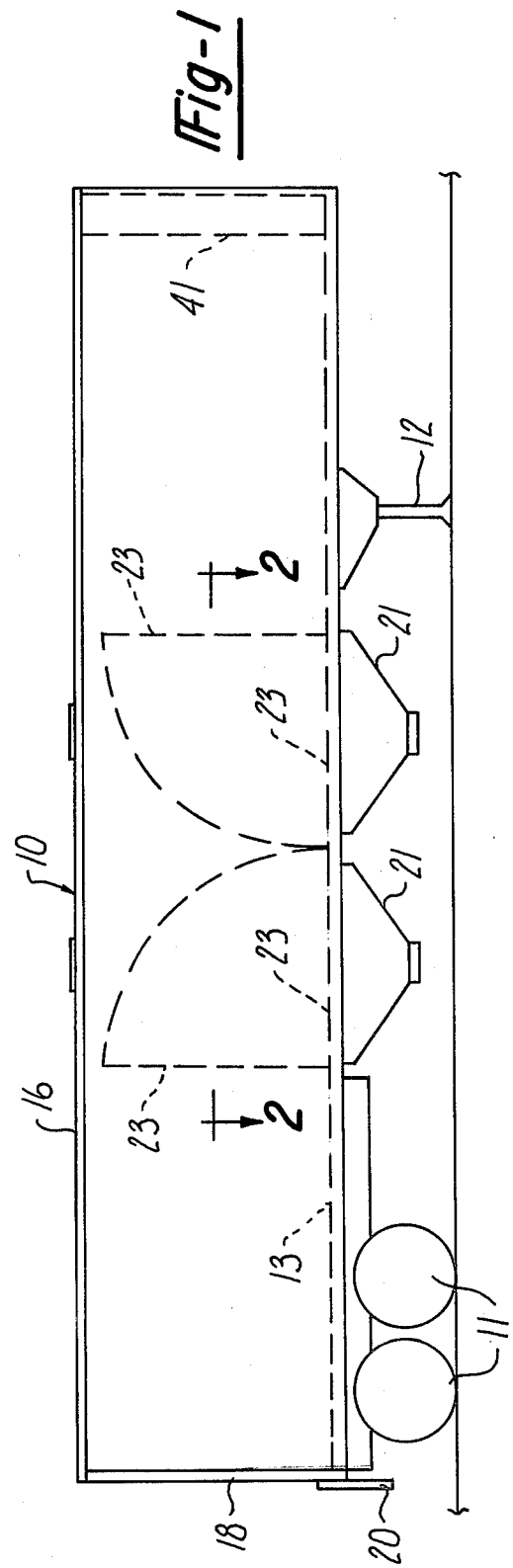
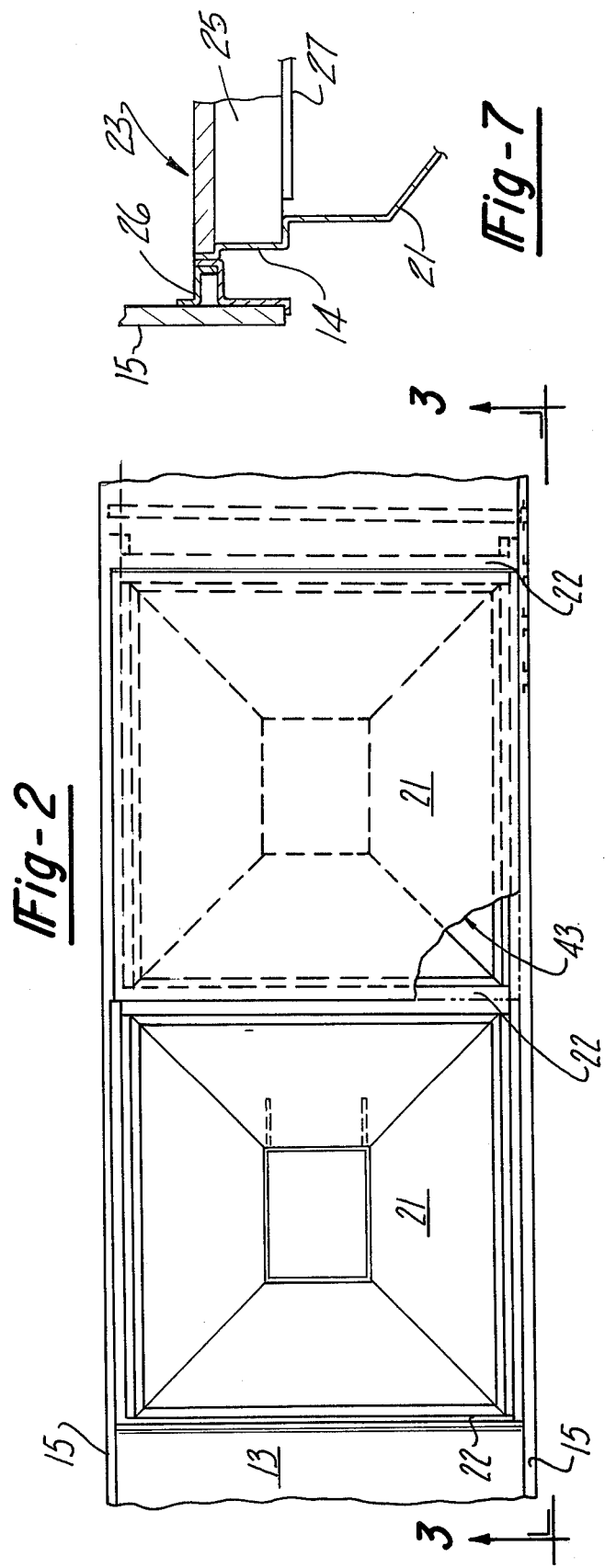

MULTI-PURPOSE FREIGHT VEHICLE

BACKGROUND

There have been many proposals for converting open cargo vehicles into facilities for handling flowable bulk material, such as sugar, cement, lime, sand, gravel, stones, silage, foodstuffs, and the like.

One proposal is to provide a full liner for a vehicle compartment and to fold the liner against a compartment wall when not in use.

Another proposal is to provide movable wall panels within a container which can be erected above hoppers to provide a receptacle for bulk material.

Another proposal is to provide bottom hoppers beneath spaced floor beams and side-hinged floor trap doors together with a removable inside liner having a top fill opening.

Another proposal is to provide bottom hoppers beneath side-hinged floor sections and to provide circular-section bags having rigid hoops and inflatable vertical side tubes for erecting them, the bags being stored in the hoppers when deflated.

SYNOPSIS OF INVENTION

The present invention provides a multi-purpose freight vehicle which, in one condition, presents a completely open fully floored unobstructed compartment for hauling packaged goods and which is provided with bottom hoppers, trap doors, flexible bags and top fill openings for hauling bulk material, the bags being stored in the hoppers when collapsed together with means for raising the trap doors and holding them in vertical position to form side-retaining means for the filled bags, the floor trap doors being mounted on transverse hinges to swing up across the container and having transverse floor beams which at their ends rest on side sills of the container when down, and the trap door floor beams being covered by a smooth sheet to present a smooth surface to the bags to avoid damage to them. The means for raising and holding the trap doors being removable when not used and stowable in a front space.

Front and rear doors of the container provide access for raising and securing the trap doors and also for handling packaged goods, if desired, in the available end spaces left when the mid-portion of the container is in condition for hauling bulk goods.

The roof fill openings are provided with means which cooperate with means on the bags for holding the bags securely in upright position for filling. Means are also provided for engaging elements on the bags and raising them by working through the top fill openings, this retrieval means comprising a telescopic or jointed pole with a hook for engaging attachment means, such as a loop cord on the bag near the upper end.

A bag is very flexible so as to collapse completely within a bottom hopper. It is rectangular in section and cubical at the bottom, frusto-pyramidal thereabove, and tubular at the top end to enter the roof fill opening.

The extreme top end of the bag is made of a more flexible material and provided with fastening means to seal when filled. A cover is provided for the fill opening in the roof to protect against weather, the cover being usable either with the top end of a bag supported in the opening or dropped down inside the container.

DRAWINGS

The objects of the invention, as well as various features of novelty and advantages, will be apparent from the following description of an illustrative embodiment, reference being made to the accompanying drawings thereof, in which;

FIG. 1 is a side elevation of a roadway vehicle trailer body embodying the invention;

FIG. 2 is a partial enlarged horizontal section taken on the line 2—2 of FIG. 1;

FIG. 7 is a partial enlarged transverse vertical section taken on the line 7—7 of FIG. 1;

SPECIFIC EMBODIMENT

Figure 3:
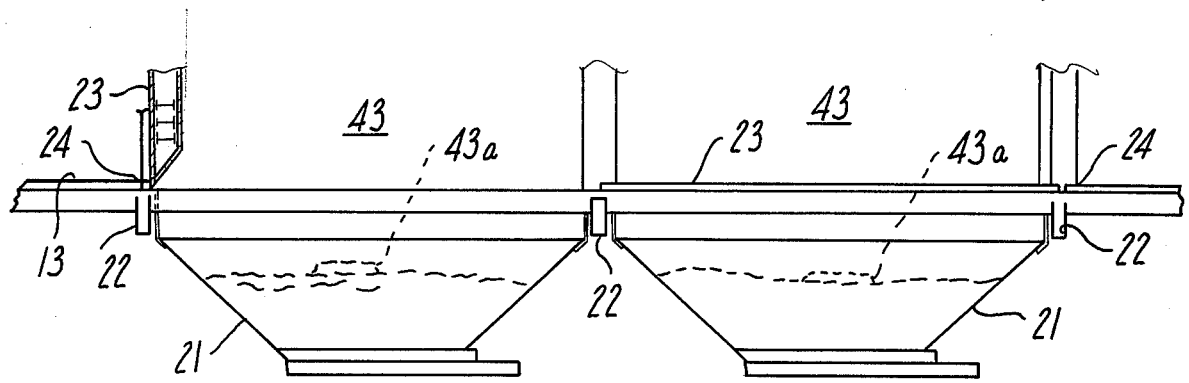
FIG. 3 is a partial side elevation and section taken on the line 3—3 of FIG. 2.
Figure 4:
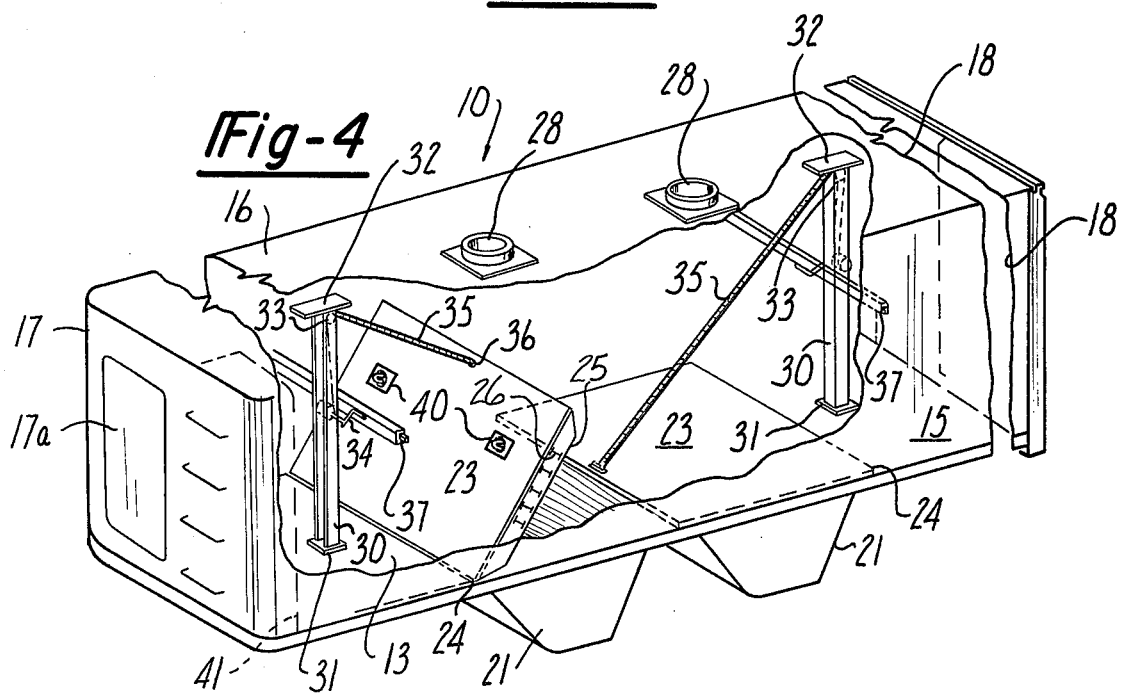
FIG. 4 is a shortened isometric view, with parts broken away, showing the hinged floor trap doors together with operating and holding means for the trap doors.
Figure 5:
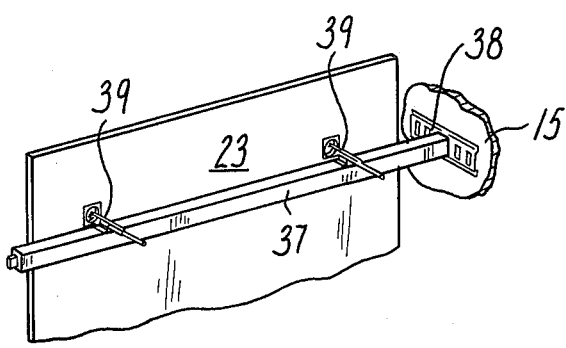
FIG. 5 is an isometric view of trap door securing means shown in FIG. 4.
Figure 6:
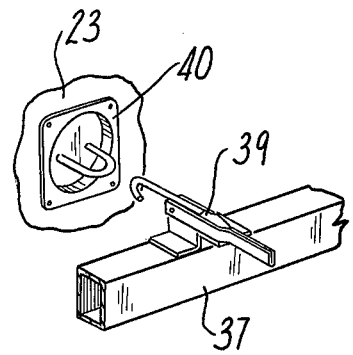
FIG. 6 is an enlarged view of a trap door securing device shown in FIG. 5.

The vehicle illustrated is a roadway trailer 10 having a compartment-forming body supported on wheels 11 and retractible rest supports 12, the body under the front end having the usual king pin (not shown) for engaging coupling means on a tractor.

A body compartment is formed by a floor 13 with side sills 14 connected by cross bearer beams (some to be referred to later), side walls 15, a roof 16, a front end 17 with an access door 17a, and a rear end with access doors 18. In the wheel region the side sills are strengthened by reinforcing beams 19. A step 20 is provided on the rear and ladder means is provided on the front.

Intermediate the length of the body one or more hoppers 21 are provided with discharge door means of a usual type (not shown in detail). Heavy cross bearer beams 22 are provided fore and aft at the upper open end of the hoppers and between hoppers when there are more than one. Two are shown.

Above the hopper opening, or openings, there are provided hinged floor sections or floor trap doors 23 carried by transverse hinges 24, as of the piano type, or the like.

The floor trap door 23 carries transverse beams 25 which at their ends when the trap door is down, (FIG. 7) rest on shoulders of the side sills 14, the floor proper resting on the top of the side sills and the top aligning with the top of a flange 26 of a longitudinal angle member secured to the side wall. A cover sheet 27, as of plywood, metal, plastic or the like, is secured beneath the cross beams 25 to provide a smooth retainer surface for container bags when in the usable raised position and filled.

The roof 16, centrally over a hopper 21, is provided with a top fill opening 28 having a bag support ring 29.

Means are provided for raising and lowering the floor trap doors 23 and securing them in a substantially vertical position at the opposite end edges of the hopper openings, such means being insertable in position and removable for storage after use to leave the vehicle compartment clear for package goods when the floor trap doors are closed.

As shown, support posts 30 are secured between recessed floor anchorages 31 and roof anchorages 32, the posts being insertable and removable from the anchorages by endwise movement. The posts carry pulleys 33 at the top and strand winding winch means 34 at a lower position convenient for operating access. A strand or cable 35 is detachably secured to a recessed end anchorage 36 at the edge of a floor trap door and is taken in at the winding means to raise the floor trap door, the strand being held in wound position on the winch, as by a usual ratchet pawl.

For securing the floor trap door in raised position a transverse bar 37 is secured between recessed anchorages 38 in the side walls, the bar being insertable and removable by endwise movement in known way in selectable openings in the anchorages. A raised floor trap door is held against a transverse bar by any convenient means, as shown by toggle latches 39, one on each side of the center post, the hook end of a latch engaging a recessed anchor means 40 secured on the floor trap door. Screw clamp devices, such as are common on ship port hole closures, could be used instead of the toggle means, if desired; or other securing of various known types could be used.

When the posts, cross bars, and cables are not needed they can be stowed in a small storage compartment or cabinet 41 at the front end wall of the vehicle at one side of the door 17a.

Figure 8:
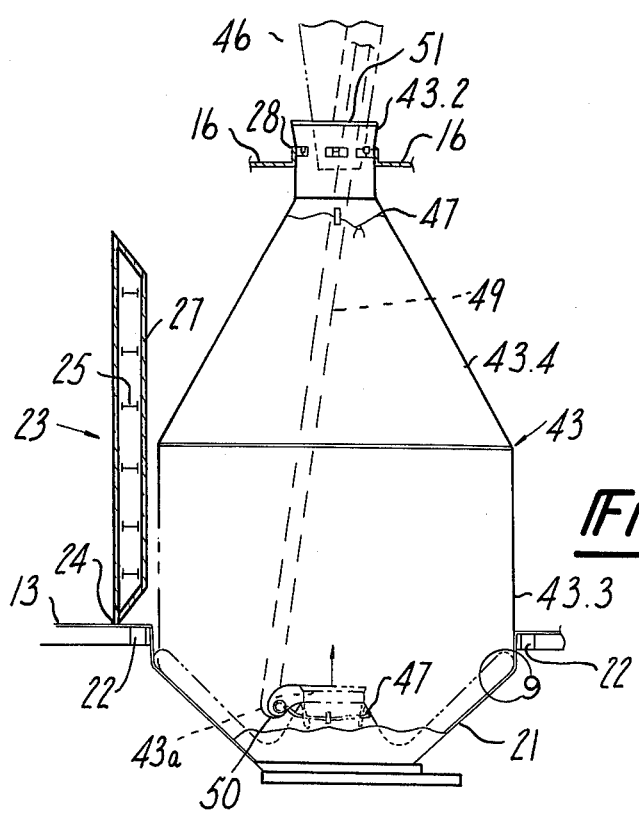
FIG. 8 is a side elevation of a bag in raised extended position between a hopper opening and a roof fill opening, the collapsed bag in the hopper being shown below in dotted lines.
Figure 9:
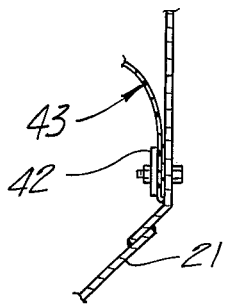
FIG. 9 is an enlarged section taken in the zone of circle 9 of FIG. 8 showing the attachment of the bottom open end of the bag in the hopper.
Figure 10:
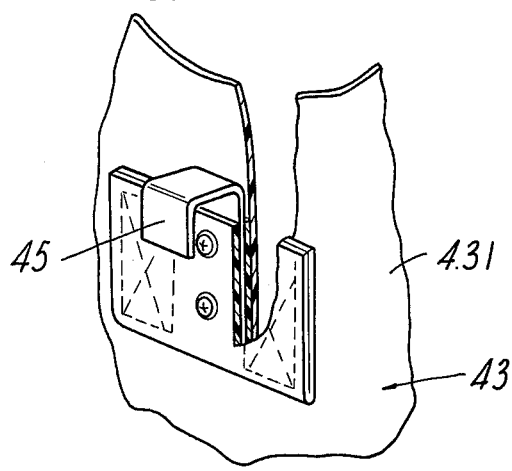
FIG. 10 is an enlarged vertical section taken near the upper end of a bag.
Figure 11:
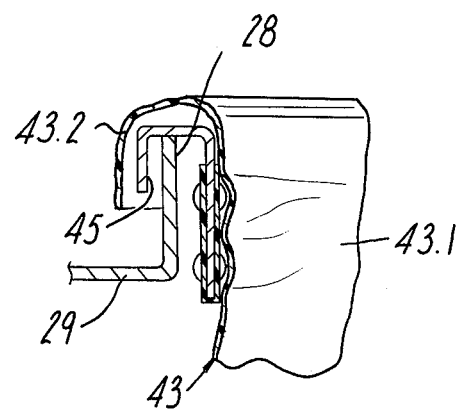
FIG. 11 is an enlarged vertical section showing the upper end of a bag supported in the roof fill opening of the vehicle.

In each hopper opening there is secured, as by a metal band and bolts, the doubled lower edge 42 (FIG. 9) of the bottom open end of a container bag 43, the upper end portion 43.1 of the bag being of a reduced size and cylindrical to enter a roof fill opening 28 and having a plurality of hooks 45 engaging the ring 29 to support the bag for filling, as by a filling spout 46, shown in broken lines in FIG. 8.

The bag 43 in extended position is shown in full lines in FIG. 3 and in broken lines therebelow in the hopper in broken lines at 43a. Near its upper end the bag is provided with retrieval means 47, such as a strong strand, for example a nylon rope, passing through loops 48 secured to the bag. When the floor trap doors are in raised position, access for raising the bag is through the roof fill opening. A retriever pole 49 with a catch hook 50 forms a convenient means for engaging the loop strand 47 to pull the small upper end of the bag up to and through the roof fill opening. The pole conveniently can be made jointed or telescopic to be shortened after use for storage in the accessory cabinet at the front.

The extreme upper end of the bag beyond the support hooks is formed of a lighter more flexible material in a flared end extension 43.2 which can be gathered and bound after filling, as by a cord or connectible "Velcro" strips 51 to seal the bag against escape of dust after filling. The sealed end extension is placed inside the fill opening after filling and a cover cap is placed over the fill opening to exclude weather, either with the bag top supported or released and dropped down on the bag.

The bag is made of very strong flexible material which will not stick to adjacent surfaces at any expected high temperatures, which will not become stiff or brittle at low temperatures, which is dust proof, which will withstand abrasive material, which has good wear resistance, which is smooth to allow easy flow of material, and which has little stretch. One such material which has proved suitable for handling many bulk materials is a "Hypalon" coated nylon fabric, for example that specified as Poly-R fabric 5 oz./sq.yd, "Shelter-Rite". Fiber glass or other strong flexible fabric might serve.

The lower end portion of the bag is rectangular and cubical to fit above the rectangular hopper opening, the hopper opening extending completely across the vehicle between side sills and longitudinally extending from one cross beam to another, that is the space covered by a trap door when down. The bottom cubical portion of the bag is designated as 43.3; the part thereabove is formed as a truncated pyramidal portion 43.4 and this tapers to join the tubular cylindrical portion 43.1 which carries the support hooks. It is preferred that all seams except that connecting the top flexible portion 43.2 will run longitudinally rather than across the bag.

If bags tend to bulge when filled they are retained by the side walls of the container, by the lined sides of the trap doors, and by an adjacent bag when more than one is used. The fact that the material of adjacent bags may engage under pressure when the bags are loaded makes it important to have coating material which not stick together even at elevated temperatures which are sometimes encountered.

The provision of hoppers with rectangular top openings, of bags which are rectangular to completely cover the hopper openings, and of transversely hinged trap doors which, when raised stand in vertical position alongside the sides of the hopper openings and alongside the bags, provides a number of important advantages. One such advantage is to protect the bags from injury when in the raised position and filled, not possible if the trap doors opened on longitudinal hinges to the sides. Another advantage is that objects cannot readily drop into the hoppers when the bags are collapsed in the hoppers and before the trap doors are closed. Another advantage is that package goods, if carried — as they may be, cannot be damaged by getting near the bulk goods, the raised trap doors providing almost complete separation between the bulk goods zone and the end zones which are open and available for carrying packaged goods or for other purposes if desired.

When a floor trap door is in the lower closed position it may be held down by suitable retaining means (not shown) but it has been found that the trap door with its cross bearer beams and liner has sufficient weight to hold it down and sufficient rigidity to keep it even and avoid rattling, and this is especially true when packaged goods are loaded on it. The tight fit of the ends of the trap door cross beams and floor boards with the side sills with their shouldered formation avoids side twist of the trap doors and aids in holding them down securely.

Reference has been made to selective use of the vehicle for container and bulk hauling, but, as indicated above, there is a possible combination service possible because of the arrangement of the transversely hinged trap doors which provide substantially complete zone separation and leave clear floor space at the ends.

Further, it will be understood that the length of the hopper zone may be made greater than shown, if desired, within the available space between wheel and coupling zones.

While one embodiment of the invention has been described for purposes of illustration, it is to be understood that there may be various embodiments and modifications within the general scope of the invention.

I claim:

1. A multi-purpose freight vehicle, comprising in combination, a vehicle container having a floor, sidewalls, and roof, an open-top hopper beneath the floor, a fill opening in the roof above the hopper opening, a flexible container bag having an open bottom end disposed in the hopper opening, retaining means between the upper end of the bag and the car roof at said fill opening, a transversely hinged floor section trap door movable from a lower position covering the hopper opening to confine the side of the bag when raised and filled, roof and floor anchorages, a removable post disposed to be secured to said anchorages at the end of said hopper opening, and means carried by said post for raising said trap door from its lower position over said hopper to an upper position across said container alongside said hopper opening.

2. A multi-purpose freight vehicle as set forth in claim 1, which further includes transverse floor beams secured beneath the floor trap door, the floor beams resting at their ends on side sills of the container when the floor trap door is down.

3. A multi-purpose freight vehicle as set forth in claim 1, further characterized by the fact that the hoppers opening is rectangular and spans the width of the container floor, and that the lower end portion of the bag is of a rectangular shape fitting the opening of the hopper.

4. A multi-purpose freight vehicle as set forth in claim 1, further characterized by the fact that the fill opening in the roof of the container has bag support ring and that the bag near the upper end is provided with support hooks engaging said roof support ring.

5. A multi-purpose freight vehicle as set forth in claim 1, further characterized by the fact that said bag at its upper end above the support is provided with a more flexible extension portion and fastener means for closing it tightly to seal it.

6. A multi-purpose freight vehicle as set forth in claim 1, further characterized by the fact that said bag near its upper end is provided with a retrieval means which can be engaged to raise the bag out of the hopper and bring its upper end through the roof opening.

7. A multi-purpose freight vehicle as set forth in claim 1, which further includes compartment side walls, a cross bar removably secured between said compartment side walls at said post, and means for tightly securing the floor trap door to the cross bar at each side of the post.

8. A multi-purpose freight vehicle as set forth in claim 1, further characterized by the fact that two adjacent hoppers are provided beneath the floor on the sides of a transverse intermediate floor cross beam, and oppositely-opening floor trap doors hinged transversely to swing up oppositely, the doors when down covering the openings of the hoppers and meeting on said intermediate cross beam.

9. A multi-purpose freight vehicle as set forth in claim 1, wherein the top opening of the hopper is rectangular, said bag at the open lower end being rectangular to match the hopper opening and being cubical for a distance above the opening, the trap door in raised position forming a retaining wall for the side of the bag in case it bulges when loaded.

10. A multi-purpose freight vehicle as set forth in claim 9, wherein said floor trap door is provided with transverse floor beams and a smooth liner thereover to present a smooth surface to the bag.

11. A multi-purpose freight vehicle as set forth in claim 9, wherein the part of the bag above the cubical lower part is frusto-pyramidal, converging to circular and connecting with a tubular cylindrical portion extending through the roof fill opening.

12. A multi-purpose freight vehicle as set forth in claim 9, wherein two hoppers are arranged adjacent each other with an intermediate transverse floor beam between their top openings, there being transversely-hinged floor trap doors disposed fore and aft of the hopper openings, the trap doors when raised presenting smooth surfaces toward the bags when raised, the trap doors when down having their free edges supported on the intermediate floor beam, the bags when filled being confined by the side walls of the container, by the smooth surfaces of the raised trap doors, and by each other in case of bulging, the bags in at least their lower cubical portions having smooth non-sticking outer surfaces.

13. A multi-purpose freight vehicle, comprising in combination, a vehicle container having a floor, sidewalls, and roof, and opentop hopper beneath the floor, a fill opening in the roof above the hopper opening, a flexible container bag having an open bottom end disposed in the hopper opening, retaining means between the upper end of the bag and the car roof at said fill opening, a transversely hinged floor section trap door movable from a lower position covering the hopper opening to confine the side of the bag when raised and filled, a cross bar, and side wall anchorages for removably securing said cross bar in position to hold the trap door in raised position.

14. A multi-purpose freight vehicle as set forth in claim 13, which further includes means carried by said cross bar for securing the floor trap door to said cross bar.

15. A multi-purpose freight vehicle, comprisng in combination, a vehicle container having a floor, sidewalls, and roof, an open-top hopper beneath the floor, a fill opening in the roof above the hopper opening, a flexible container bag having an open bottom end disposed in the hopper opening, retaining means between the upper end of the bag and the car roof at said fill opening, a transversely hinged floor section trap door movable from a lower position covering the hopper opening to confine the side of the bag when raised and filled, transverse floor beams secured to said hinged floor section trap door whereby said hopper opening is completely open when said door is in a raised position, mechanical means for raising said trap door from its lower position over said hopper to an upper position across said container alongside said hopper opening, and means for maintaining said trap door in said upper position after it has been raised from its lower position.

* * * * *